United States Patent [19]

MacDonald

[11] 4,388,988

[45] Jun. 21, 1983

[54] ANTI-KICKBACK CLUTCH-BRAKE UNIT

[75] Inventor: J. G. Fraser MacDonald, Detroit, Mich.

[73] Assignee: Warner Electric Brake & Clutch Company, South Beloit, Ill.

[21] Appl. No.: 262,139

[22] Filed: May 11, 1981

[51] Int. Cl.³ ............................................. F16D 67/02
[52] U.S. Cl. .............................. 192/12 BA; 192/18 R
[58] Field of Search ............. 192/12 BA, 12 R, 18 R, 192/35, 36, 48.1, 48.7, 41 S, 81 C; 56/11.3

[56] References Cited

U.S. PATENT DOCUMENTS

| 3,637,056 | 1/1972 | Baer | 192/12 BA |
| 3,685,622 | 8/1972 | Baer et al. | 192/35 |
| 3,915,268 | 10/1975 | MacDonald | 192/12 BA |
| 3,978,947 | 9/1976 | Modersohn | 192/12 BA |
| 4,330,054 | 5/1982 | MacDonald | 192/35 |

Primary Examiner—George H. Krizmanich
Attorney, Agent, or Firm—Leydig, Voit, Osann, Mayer & Holt, Ltd.

[57] ABSTRACT

A helical spring clutch-brake unit in which the spring is prevented from wrapping down and momentarily engaging the clutch if the output member of the clutch is manually turned while the clutch is disengaged.

4 Claims, 8 Drawing Figures

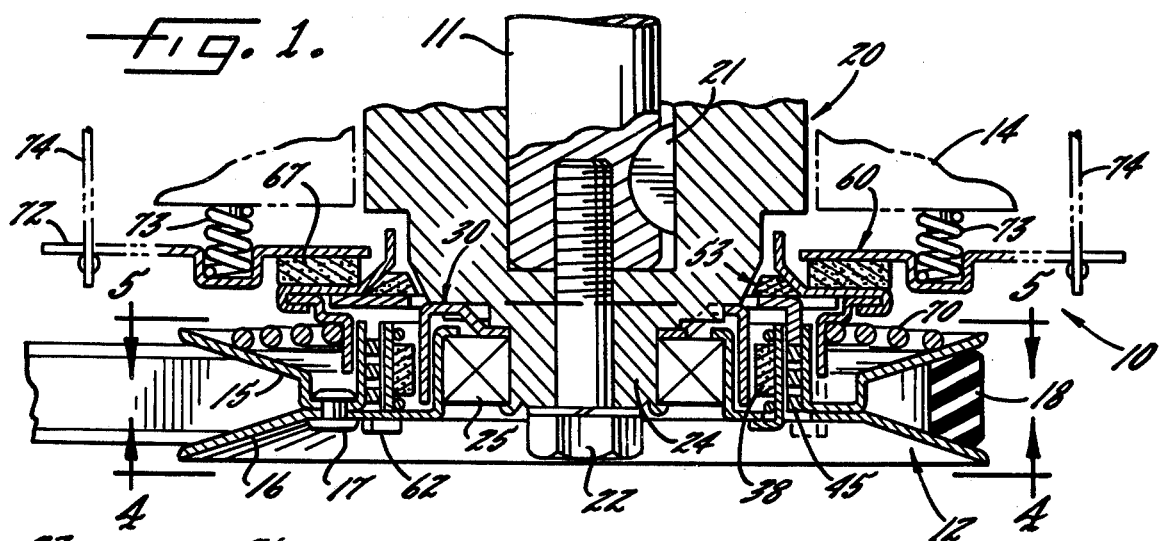

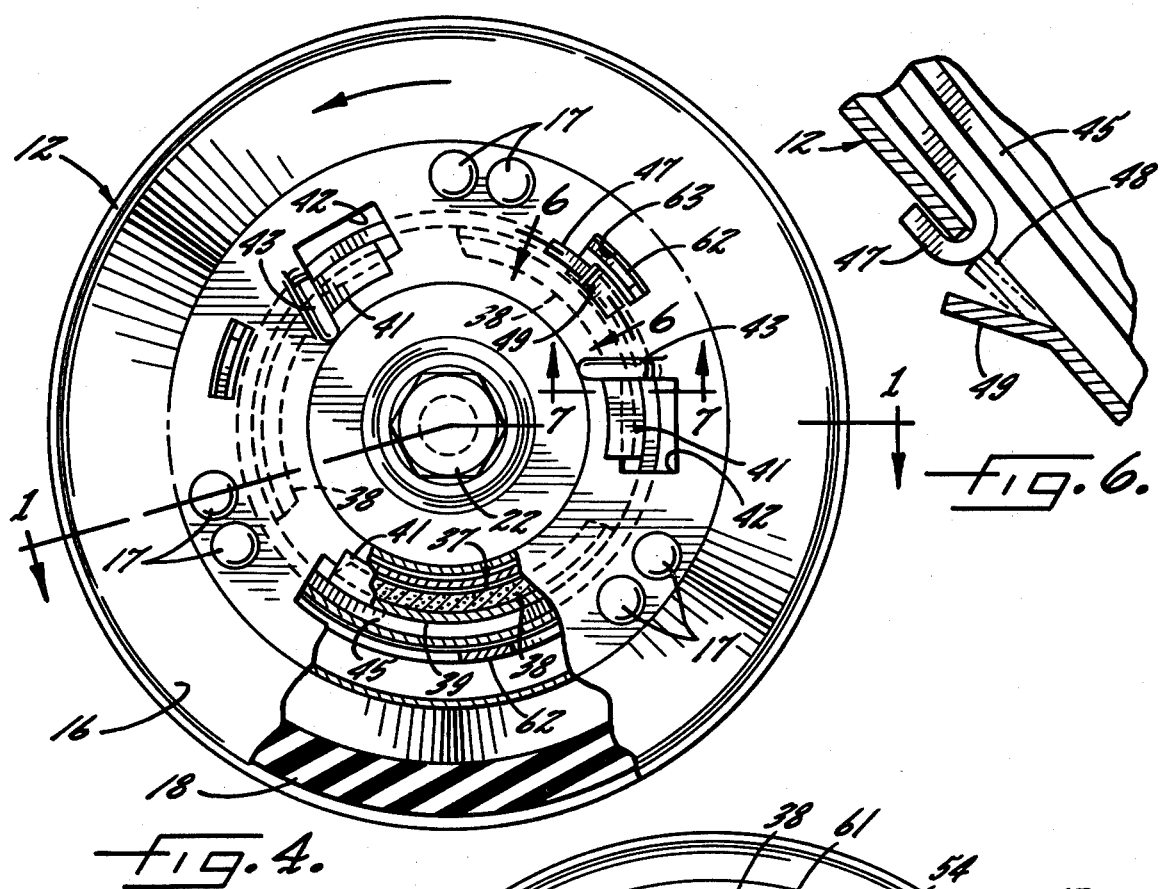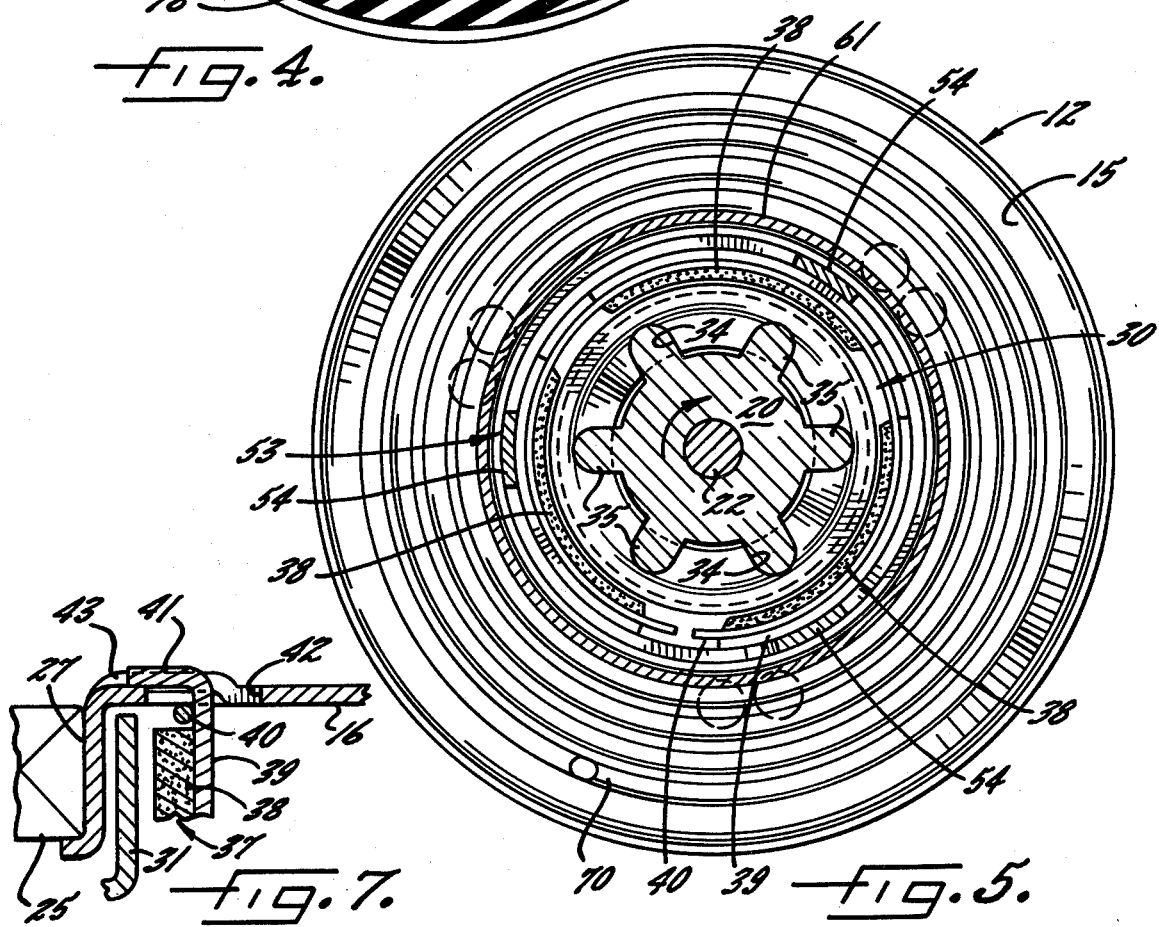

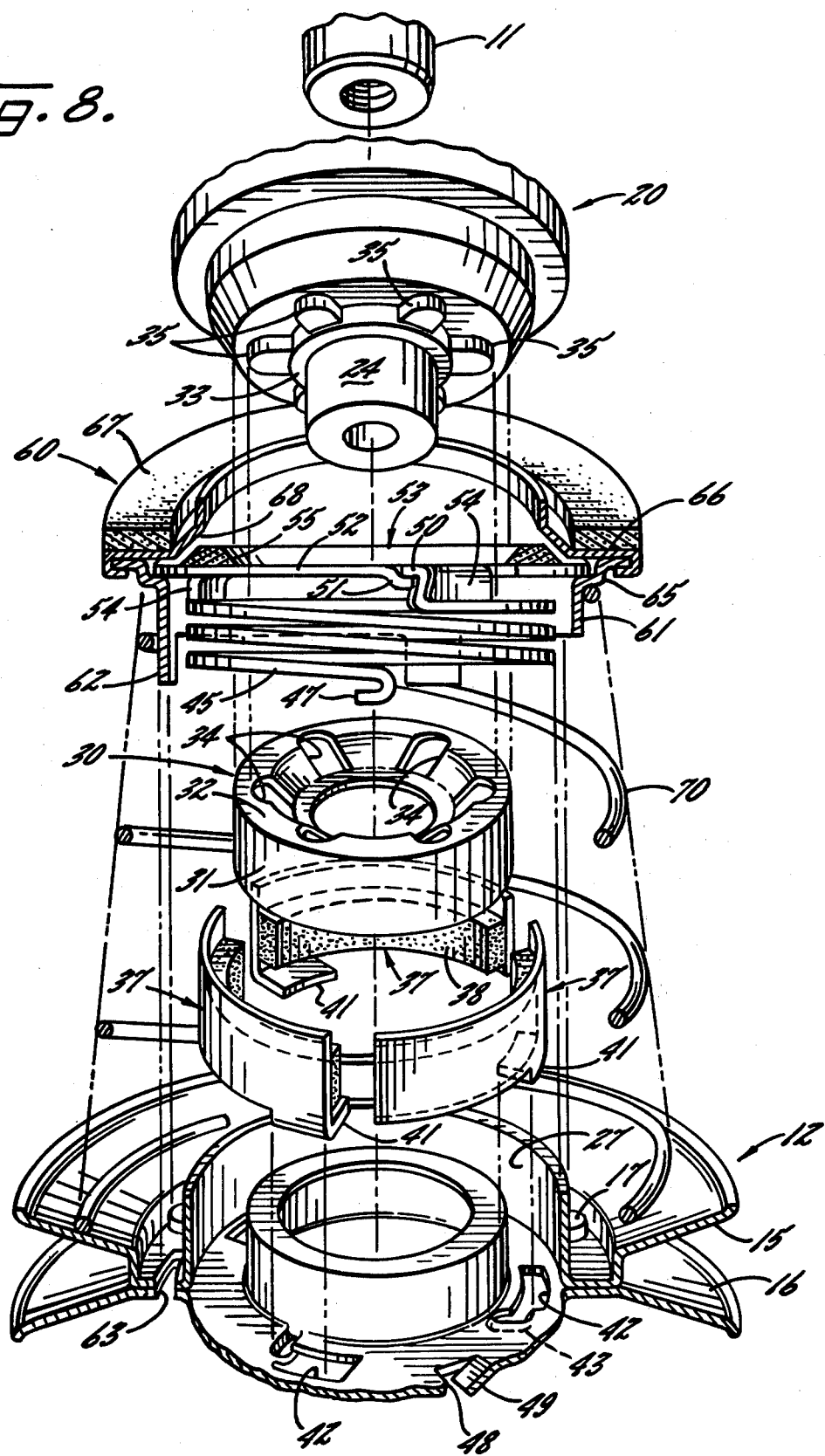

ANTI-KICKBACK CLUTCH-BRAKE UNIT

BACKGROUND OF THE INVENTION

This invention relates to a clutch-brake unit of the type in which an input member and an output member are coupled to rotate in unison when a friction shoe is moved into frictional engagement with and is turned by the input member. The invention more specifically relates to a clutch in which the friction shoe may be engaged with relatively low force and in which the force acting on the friction shoe is amplified to enable the clutch to possess relatively high torque capacity.

An amplifying clutch of this general type is disclosed in MacDonald U.S. application Ser. No. 151,340, filed May 19, 1980, entitled Amplifying Clutch With Radially Contractible Shoe and assigned to the assignee of the present invention. In that clutch, turning of the friction shoe by the input member creates a pilot torque which is used to contract a helical spring. The spring amplifies the pilot torque by wrapping down on a series of angularly spaced shoe segments and causing the shoe segments to radially grip the input member and transmit torque of substantial magnitude to the output member.

The friction shoe is adapted to be moved out of engagement with the input member by a braking ring. The braking ring applies a retarding torque to the output member when the braking ring is moved to disengage the friction shoe from the input member.

SUMMARY OF THE INVENTION

The general aim of the present invention is to provide a new and improved clutch-brake unit of the foregoing type in which the helical spring is prevented from wrapping down and abruptly engaging the clutch in the event reverse torque is applied to the output member while the clutch is disengaged and the brake is engaged.

A more detailed object is to achieve the foregoing by providing a clutch in which the friction shoe, the output member and the braking ring are arranged in a novel manner to prevent relative rotation between the ends of the helical spring when the braking ring is holding the friction shoe out of engagement with the input member and is retarding the output member and when reverse torque is applied to the output member.

In a more specific sense, the invention resides in a helical spring clutch-brake unit in which the braking ring is positively coupled to the output member to rotate in unison with the output member and is capable of retarding both the output member and the friction shoe when the clutch is disengaged.

These and other objects and advantages of the invention will become more apparent from the following detailed description when taken in conjunction with the accompanying drawings.

BRIEF DESCRIPTION OF THE DRAWINGS

FIG. 1 is a fragmentary vertical sectional view of a new and improved clutch-brake incorporating the unique features of the present invention, the clutch being shown in a disengaged condition and being shown as taken substantially along the line 1—1 of FIG. 4.

FIG. 2 is an enlarged fragmentary view of certain parts shown in FIG. 1.

FIG. 3 is a view similar to FIG. 2 but shows the clutch in an engaged condition.

FIGS. 4 and 5 are enlarged fragmentary cross-sections taken substantially along the lines 4—4 and 5—5, respectively, of FIG. 1.

FIGS. 6 and 7 are enlarged fragmentary cross-sections taken substantially along the lines 6—6 and 7—7, respectively, of FIG. 4.

FIG. 8 is an exploded perspective view of certain parts of the clutch.

DETAILED DESCRIPTION OF THE PREFERRED EMBODIMENT

As shown in the drawings for purposes of illustration, the invention is embodied in a clutch-brake 10 for selectively coupling a rotatable driving member 11 to a rotatable driven member 12. In the present instance, the driving member 11 is the shaft of a motor or engine (not shown) while the driven member 12 is a pulley which forms part of the blade drive of a lawnmower. The shaft 11 extends through the deck 14 of the mower while the pulley 12 is located below the deck. The pulley defines the output member of the clutch 10 and is formed by upper and lower discs 15 and 16 which are riveted together at 17 (FIG. 1). A drive belt 18 is trained around the pulley.

The clutch 10 comprises an input member 20 which is keyed to the driving shaft 11 at 21. A screw 22 extends through the input member and is threaded into the driving shaft to hold the input member on the shaft. The input member is adapted to be rotated in a clockwise direction as shown in FIG. 5.

At its lower end, the input member 20 is formed with a reduced diameter portion 24 which supports a ball bearing 25. The bearing is held in place by staking over the lower end of the reduced diameter portion as indicated at 26 in FIG. 2. An upwardly projecting annular flange 27 is formed integrally with the lower disc 16 of the pulley 12 and is fixed to the bearing, the pulley thereby being journaled by the bearing for rotation relative to the input member.

An input hub 30 is secured to the input member 20. As shown in FIG. 2, the input hub includes an axially extending annular flange 31 located just outwardly of the flange 27 of the pulley 12 and further includes an inwardly extending annular flange 32 which is formed integrally with the upper end of the axial flange. The inner end portion of the flange 32 is clamped between the upper side of the bearing 25 and a shoulder 33 defined at the upper end of the reduced diameter portion 24 of the input member 20. Angularly spaced slots 34 (FIG. 8) are formed in the flange 32 and receive angularly spaced lugs 35 which are formed integrally with the input member 20. The lugs and the slots coact to key the input hub 30 rigidly to the input member 20 and to cause the input hub to rotate in unison with the input member.

The flange 31 of the input hub 30 is adapted to be gripped and released by angularly spaced shoe segments 37 to cause the clutch 10 to engage and disengage, respectively. Herein, there are three shoe segments and each comprises an arcuate band 38 (FIG. 7) of friction material adapted to frictionally grip the flange 31 of the input hub 30. Each friction band is bonded to the inner side of an arcuate metal mounting band 39. Upper and lower split rings 40 of resilient music wire are located above and below the friction bands 38 and are seated within grooves in the inner sides of the mounting bands 39. The resilient rings urge the mounting bands outwardly and bias the friction bands away from the flange 31 of the input hub.

An inturned finger 41 (FIG. 7) is formed at one end of each mounting band 39 along the lower side thereof. The fingers fit within angularly spaced slots 42 formed through the lower disc 16 of the pulley 12 and key the shoe segments 37 to the pulley. When the shoe segments are turned in a counterclockwise direction (FIG. 4), the leading edges of the fingers 41 bear against lugs 43 which are struck downwardly from the lower disc 16 of the pulley 12 adjacent the leading edges of the slots 42. While the fingers 41 and the slots 42 couple the shoe segments 37 and the pulley 12 for rotation in unison, the slots permit the fingers to move inwardly and outwardly in a radial direction so that the friction bands 38 may grip and release the input hub 30.

In order to contract the friction bands 38 of the shoe segments 37 radially into gripping engagement with the input hub 30, a coiled helical spring 45 is telescoped over the mounting bands 39 of the shoe segments. Antifriction bearing tape 46 (FIG. 3) is applied to the outer sides of the mounting bands to reduce sliding friction between the mounting bands and the coils of the helical spring.

The lower end of the helical spring 45 is formed with a bent tang 47 (FIG. 6) which is hooked into a slot 48 in the lower disc 16 of the pulley 12, the slot being formed by striking a tab 49 downwardly out of the lower disc. After the tang 47 has been hooked into the slot, the tab is bent upwardly into engagement with the tang as shown in broken lines in FIG. 6.

A bent tang 50 (FIG. 8) also is formed on the upper end of the helical spring 45. The upper tang is hooked over a tab 51 which is struck downwardly from a disc 52 which forms part of an annular friction shoe or clutch shoe 53. Three angularly spaced lugs 54 are formed integrally with and project downwardly from the disc 52 and are adapted to engage the top coil of the spring 45 as shown in FIG. 8. The upper tang 50 of the spring bears against the sides of one of the lugs 54 (see FIG. 8).

A ring 55 of friction material is bonded to the upper side of the disc 52 and its inner periphery is formed with a frustoconical surface which is adapted to mate with a frustoconical surface on the input member 20. When the two surfaces are in frictional engagement, the input member turns the shoe 53 such that the upper tang 50 of the spring 45 is rotated relative to the lower tang 47 in a direction causing the spring to contract radially or to wrap down. The spring thus contracts around the mounting bands 39 of the shoe segments 37 and forces the friction bands 38 of the shoe segments radially inwardly into tight gripping engagement with the input hub 30. Accordingly, the shoe segments turn with the input hub and, by virtue of the fingers 41, the shoe segments turn the pulley 12. The clutch 10 thus is engaged to cause the output pulley 12 to turn in unison with the input shaft 11. When the helical spring is allowed to relax and unwind, the resilient wires 40 shift the shoe segments 37 outwardly to release the friction bands 38 from the input hub 30. The clutch thus is disengaged to enable the output pulley to remain stationary while the input shaft continues to rotate.

The present invention contemplates the provision of unique means for engaging and disengaging the clutch 10 and for applying a braking torque to the output pulley 12 when the clutch is disengaged. The invention is particularly characterized by the fact that the spring 45 cannot be wrapped down to engage the clutch if the output pulley is manually turned while the clutch is disengaged and braking torque is being applied to the output pulley. As a result, the danger of injury to the operator of the mower is reduced.

More specifically, the foregoing is achieved through the provision of a braking ring 60 which is positively coupled to the output pulley 12 to rotate in unison with the pulley and which is capable of causing the clutch shoe 53 to rotate with the pulley when the clutch 10 is disengaged. As shown in FIG. 2, the braking ring 60 comprises an axially extending annular skirt 61 which is located outwardly of the flange 27 of the upper disc 15 of the pulley. Three angularly spaced fingers 62 are formed integrally with and depend from the lower edge of the skirt and are received within slots 63 which are formed through the pulley discs 15 and 16. The fingers 62 and the slots 63 are sized to enable the fingers to slide axially or upwardly and downwardly within the slots but to prevent relative rotation between the fingers and the pulley discs. Thus, the fingers key the braking ring 60 and the pulley 12 together for rotation in unison while permitting the braking ring to shift axially.

A radially extending flange 65 (FIG. 2) is formed integrally with the upper end of the skirt 61 and projects outwardly therefrom. The flange 65 is staked rigidly to the outer end portion of a radially extending disc 66 which forms part of the braking ring 60. Bonded to the upper side of the disc 66 is an annulus of friction material 67 which also forms part of the braking ring. In carrying out the invention, an upwardly and inwardly extending frustoconical wing 68 is formed integrally with the inner end of the disc 66 and is adapted to engage a frustoconical surface formed on the periphery of the friction ring 55 of the clutch shoe 53.

The clutch 10 itself is completed by a coiled conical spring 70 which encircles the skirt 61 of the braking ring 60 and which is compressed between the flange 65 of the braking ring and the upper disc 15 of the pulley 12. The spring 70 urges the braking ring upwardly to a clutch-engaged position (FIG. 3) and, when the braking ring shifts upwardly to this position, its flange 65 engages the disc 52 of the clutch shoe 53 and forces the latter upwardly to press the inner frustoconical surface of the friction material 55 into engagement with the frustoconical surface of the input member 20. The conical spring 70 yields to permit the braking ring 60 to shift downwardly to a clutch-disengaged position shown in FIG. 2. When the braking ring 60 is shifted downwardly, its disc 66 engages the disc 52 of the clutch shoe 53 and forces the shoe downwardly against the compressive action of the helical spring 45 to move the friction ring 55 out of engagement with the input member 20. In addition, the frustoconical wing 68 of the braking ring frictionally engages the outer frustoconical surface of the friction ring 55.

To engage and disengage the clutch 10, a manually operable element in the form of a collar 72 (FIG. 2) is suitably supported for up and down movement beneath the deck 14 of the mower. The collar 72 is urged downwardly by a series of angularly spaced coil springs 73 which are compressed between the collar and the deck. The springs 73 normally hold the collar in engagement with the friction material 67 of the braking ring 60 so that the collar applies a retarding force to the braking ring. Cables 74 (FIG. 1) or the like are connected between the collar 72 and a suitable part such as an operating lever (not shown) on the mower. When the operating lever is actuated manually to pull on the cables, the collar 72 is lifted away from the friction material 67 (see FIG. 3). When the operating lever is manually released, the springs 73 force the collar downwardly into engagement with the friction material 67 as shown in FIGS. 1 and 2.

Operation

The total downward force exerted on the actuating collar 72 by the springs 73 is greater than the combined upward force exerted on the braking ring 60 by the conical spring 70 and exerted on the clutch shoe 53 by the compressive action of the helical spring 45. Accordingly, when the manual operating lever is released and the cables 74 are slack, the springs 73 press the collar 72 downwardly against the friction material 67 as shown in FIG. 2. The braking ring 60 thus is forced downwardly to its clutch-disengaged position (FIG. 2) against the action of the conical spring 70. The disc 66 of the braking ring engages the disc 52 of the clutch shoe 53 and forces the shoe downwardly against the compressive action of the helical spring 45 to release the friction material 55 from the input member 20. The input member thus turns without transmitting torque to the output pulley 12. In addition, the pulley is held stationary by the retarding force applied by the collar 72 to the friction material 67 and transmitted from the braking ring 60 to the pulley via the fingers 62 and the slots 63.

When the operating lever is actuated, the cables 74 are tightened to lift the collar 72 upwardly against the action of the springs 73. The conical spring 70 thus forces the braking ring 60 upwardly and causes its disc 65 to push upwardly on the disc 52 of the clutch shoe 53. Accordingly, the clutch shoe is pushed upwardly to press the friction material 55 into engagement with the rotating input member 20. Such engagement creates a pilot torque which causes the clutch shoe 53 to rotate relative to the braking ring 60. Rotation of the clutch shoe turns the upper tang 50 of the helical spring 45 in a direction to cause the spring to wrap down on and contract around the shoe segments 37. The friction bands 38 of the shoe segments thus are contracted into frictional engagement with the input hub 30 to cause the shoe segments to rotate. Such rotation is transmitted to the output pulley 12 by the fingers 39 of the shoe segments so that the output pulley turns with the input member.

When the operating lever is released, the collar 72 pushes downwardly on the friction material 67 to apply a retarding force on the brake ring 60, the retarding force being transmitted directly to the output pulley 12 via the fingers 62. At the same time, the brake ring is shifted downwardly and shifts the clutch shoe 53 downwardly against the compressive action of the helical spring 45 to release the friction material 55 from the input member 20 and allow the helical spring 45 to unwind. The spring wires 40 then shift the shoe segments 37 outwardly to release the friction bands 38 from the input hub 30 and interrupt the transmission of torque from the input hub to the output pulley 12.

When the clutch 10 is disengaged, the operator of the mower may attempt to manually turn the pulley 12 (or a mower blade connected thereto). With conventional clutches having a helical spring, such manual turning could cause the two ends of the spring to turn relative to one another so that the spring would wrap down and momentarily engage the clutch with resulting injury to the operator. This danger is avoided, however, with the present clutch 10. If the operator manually turns the pulley 12 so that the lower end 47 of the spring 45 turns, the brake ring 60 also turns by virtue of the fingers 62. The frustoconical wing 68 of the brake ring bears downwardly against the friction material 55 of the clutch shoe 53, the downward force being resisted by the compressive action of the helical spring 45. This causes the braking ring to frictionally engage and turn the clutch shoe so that the clutch shoe turns in unison with the output pulley. Accordingly, both ends 47 and 51 of the helical spring 45 are turned in unison to prevent the spring from wrapping down and engaging the clutch 10. The operator thus is protected from possible injury.

I claim:

1. A clutch-brake unit comprising input and output members supported to rotate about a common axis, an annular friction shoe movable axially relative to said input and output members, resilient means biasing said shoe axially into frictional engagement with said input member and yielding to permit said shoe to move axially out of frictional engagement with said input member, said shoe rotating with said input member when said shoe is in frictional engagement with said input member, means causing said output member to turn with said input member when said shoe is in frictional engagement with and is turned by said input member, a brake ring movable axially relative to said input and output members between clutch-engaged and clutch-disengaged positions and biased to said clutch-engaged position, said brake ring being rotatable relative to said input member and serving to hold said friction shoe out of frictional engagement with said input member when said ring is in said clutch-disengaged position, means connecting said brake ring to said output member and causing said brake ring to rotate in unison with said output member when said ring is in said clutch-disengaged position, and means frictionally coupling said brake ring to said friction shoe and causing said friction shoe to rotate with said brake ring when the latter is turned while in said clutch-disengaged position.

2. A clutch-brake unit comprising input and output members supported to rotate about a common axis, an annular friction shoe movable axially relative to said input and output members, resilient means biasing said shoe axially into frictional engagement with said input member and yielding to permit said shoe to move axially out of frictional engagement with said input member, said shoe rotating with said input member when said shoe is in frictional engagement with said input member, a helical spring having one end connected to said shoe and having its opposite end connected to said output member, said spring contracting and causing said output member to turn with said input member when said shoe is in frictional engagement with and is turned by said input member, a brake ring movable axially relative to said input and output members between clutch-engaged and clutch-disengaged positions and biased to said clutch-engaged position, said brake being rotatable relative to said input member and serving to hold said friction shoe out of frictional engagement with said input member when said ring is in said clutch-disengaged position, means connecting said brake ring to said output member and causing said brake ring to rotate in unison with said output member when said ring is in said clutch-disengaged position, and means frictionally coupling said brake ring to said friction shoe and causing said friction shoe to rotate with said brake ring when the latter is turned while in said clutch-disengaged position.

3. A clutch-brake unit comprising input and output members supported to rotate about a common axis, a brake ring movable axially relative to said input and output members between clutch-engaged and clutch-disengaged positions, means biasing said brake ring to said clutch-engaged position and yielding to permit said brake ring to be moved to said clutch-disengaged position, said input member rotating relative to said brake ring when the latter is in said clutch-disengaged position, an annular friction shoe rotatable relative to said brake ring, said brake ring forcing said shoe into frictional engagement with said input member when said brake ring is in said clutch-engaged position and permitting said shoe to move out of frictional engagement with said input member when said brake ring is in said clutch-disengaged position, said shoe rotating with said input member when said shoe is forced into frictional engagement with said input member by said brake ring, a helical spring having one end connected to said shoe and having its opposite end connected to said output member, said spring contracting and causing said output member to turn with said input member when said shoe is in frictional engagement with and is turned by said input member, means positively connecting said brake ring to rotate in unison with said output member in both positions of said brake ring, and means frictionally coupling said brake ring to said friction shoe and causing said friction shoe to rotate with said brake ring when the latter is turned while in said clutch-disengaged position.

4. A clutch-brake unit comprising input and output members supported to rotate about a common axis, a brake ring movable axially relative to said input and output members between clutch-engaged and clutch-disengaged positions, resilient means biasing said brake ring to said clutch-engaging position and yielding to permit said brake ring to be moved to said clutch-disengaged position, an annular friction shoe rotatable relative to said brake ring, said resilient means forcing said shoe into frictional engagement with said input member when said brake ring is in said clutch-engaged position whereby said shoe turns with said input member, said brake ring engaging said shoe and holding said shoe out of frictional engagement with said input member when said brake ring is in said clutch-disengaged position, a helical spring having one end connected to said friction shoe and having its opposite end connected to said output member, said spring contracting and causing said output member to turn with said input member when said shoe is in frictional engagement with and is turned by said input member, said input member rotating relative to said brake ring when the latter is in said clutch-disengaged position, means positively connecting said brake ring to said output member and causing said ring to rotate in unison with said output member in both positions of said ring, means selectively operable to move said brake ring to hold said ring in said clutch-disengaged position and to apply a frictional retarding force to the ring when the ring is in the latter position, and means frictionally coupling said brake ring to said friction shoe and causing said friction shoe to rotate with said brake ring when the latter is turned while in said clutch-disengaged position.

* * * * *